United States Patent
Katsoulis et al.

(10) Patent No.: US 9,469,909 B2
(45) Date of Patent: Oct. 18, 2016

(54) ELECTROLYTIC PROCESS TO SILICIDES

(71) Applicant: Dow Corning Corporation, Midland, MI (US)

(72) Inventors: Dimitris Katsoulis, Midland, MI (US); Robert Larsen, Midland, MI (US); Robert Morgan, Midland, MI (US)

(73) Assignee: Dow Corning Corporation, Midland, MI (US)

(*) Notice: Subject to any disclaimer, the term of this patent is extended or adjusted under 35 U.S.C. 154(b) by 130 days.

(21) Appl. No.: 14/410,776

(22) PCT Filed: Jun. 26, 2013

(86) PCT No.: PCT/US2013/047747
§ 371 (c)(1),
(2) Date: Dec. 23, 2014

(87) PCT Pub. No.: WO2014/035540
PCT Pub. Date: Mar. 6, 2014

(65) Prior Publication Data
US 2015/0191832 A1 Jul. 9, 2015

Related U.S. Application Data

(60) Provisional application No. 61/694,788, filed on Aug. 30, 2012.

(51) Int. Cl.
| | | |
|---|---|---|
| C25B 1/14 | (2006.01) |
| C25B 1/18 | (2006.01) |
| C01B 33/06 | (2006.01) |
| C01B 33/04 | (2006.01) |
| C25B 1/26 | (2006.01) |

(52) U.S. Cl.
CPC .............. *C25B 1/18* (2013.01); *C01B 33/043* (2013.01); *C01B 33/06* (2013.01); *C25B 1/14* (2013.01); *C25B 1/26* (2013.01)

(58) Field of Classification Search
CPC ............ C01B 33/06; C25B 1/14; C25B 1/18
See application file for complete search history.

(56) References Cited

U.S. PATENT DOCUMENTS

| | | | |
|---|---|---|---|
| 3,022,233 A | 2/1962 | Olstowski |
| 5,716,590 A | 2/1998 | Roewer et al. |
| 6,482,381 B1 | 11/2002 | Sundermeyer et al. |
| 6,887,448 B2 | 5/2005 | Block et al. |
| 7,972,584 B2 | 7/2011 | Blencoe |

FOREIGN PATENT DOCUMENTS

| | | | | |
|---|---|---|---|---|
| CN | 102030332 B | 11/2012 | | |
| GB | 989469 A | * | 4/1965 | ............ C01B 33/06 |
| JP | 06-100696 | 12/1994 | | |

OTHER PUBLICATIONS

Jackson, et. al., "Deposition and characterization of Al—Si metallic TBC precursor on Mo—Si—B turbine materials", International Journal of Hydrogen Energy, 2007, pp. 3789-3796, vol. 32, Science Direct, Golden, Colorado.

Seefurth, et. al., "Investigation of Lithium Utilization from a Lithium-Silicon Electrode", Journal of Electrochem. Soc., Electrochemical Science and Technology, Aug. 1977, pp. 1207-1214, vol. 124, No. 8, Warren, Michigan.

Thayer, et. al., "Improving the Electrolytic Process for Magnesium Production", JOM, Aug. 2001, pp. 15-17, Salt Lake City, Utah.

Grotheer, et. al., "Industrial Electrolysis and Electrochemical Engineering", The Electrochemical Society Interface, 2006, pp. 52-54, South Carolina.

* cited by examiner

*Primary Examiner* — Keith Hendricks
*Assistant Examiner* — Salil Jain
(74) *Attorney, Agent, or Firm* — Catherine U. Brown

(57) ABSTRACT

An electrolytic process may be used to generate reactive metal silicides with Group 1 metals of the periodic table and/or Group 2 metals of the periodic table, and/or aluminum. Exemplary reactive metal silicides include magnesium silicide ($Mg_2Si$).

20 Claims, No Drawings

ELECTROLYTIC PROCESS TO SILICIDES

CROSS REFERENCE TO RELATED APPLICATIONS

This application is a U.S. national stage filing under 35 U.S.C. §371 of PCT Application No. PCT/US13/047,747 filed on 26 Jun. 2013, which claims the benefit of U.S. Provisional Patent Application No. 61/694,788 filed 30 Aug. 2012 under 35 U.S.C. §119 (e). PCT Application No. PCT/US13/047,747 and U.S. Provisional Patent Application No. 61/694,788 are hereby incorporated by reference.

Various processes in the silicon and silicone industries produce by-products in addition to the desired silicon and silicone products. For example, silicone production processes and chemical vapor deposition processes for making high purity polycrystalline silicon, such as the Siemens process, can produce silicon tetrachloride ($SiCl_4$) as a by-product. Grignard reaction processes for alkylation or arylation of chlorosilanes can produce magnesium chloride ($MgCl_2$) as a by-product. There is a need in the silicone and silicon industries to manage these by-products.

Reactive silicides are useful for making silanes such as hydridosilanes and halosilanes, which can be used as raw materials in the silicone and silicon industries. There is a need in the silicone and silicon industries to provide these raw materials.

SUMMARY

An electrolytic process may be used to generate reactive silicides. The process comprises:
(i) heating a salt comprising a metal halide of formula $MX_a$, where M is selected from the group consisting of Li, Na, K, Rb, Cs, Fr; Be, Mg, Ca, Sr, Ba, Ra; Al, and a combination thereof, subscript a is an integer of 1 or more, and each X is independently a halogen atom, thereby preparing a molten salt;
(ii) introducing to the molten salt, a gas comprising a silane of formula $H_b SiX_{(4-b)}$, where subscript b is an integer from 0 to 4 and each X is independently a halogen atom that may be the same as or different from a halogen atom in the metal halide; and
(iii) passing an electric current through the molten salt, thereby producing an electrolysis product.

DETAILED DESCRIPTION

Unless otherwise indicated by the context of the specification, all amounts, ratios, and percentages are by weight; and the articles, "a", "an" and "the" each refer to one or more. "Inert" means the environment contains 0 to 50 ppm of oxygen, alternatively less than 10 ppm of oxygen. The following abbreviations are used herein: "A-hrs" means Ampere-hours "C" means Coulombs, "° C." means degrees Celsius; "g" means grams; "h" means hours; "min" means minutes; "kPa" means kiloPascals; "mA" means milli-Amperes; "MPa" means megaPascals; "ppm" means parts per million; "sccm" means standard cubic centimeters per minute; "XRD" means x-ray diffraction. The Summary and Abstract are hereby incorporated by reference into the specification. References herein to the periodic table and Groups thereof refer to the IUPAC Periodic Table of the Elements dated 1 Jun. 2012, which may be found at http://www.iupac.org/fileadmin/user_upload/news/IUPAC_Periodic_Table-1Jun12.pdf, and the Groups thereof.

An electrolytic process may be used to generate reactive silicides. The process comprises:
(i) heating the salt comprising a metal halide of formula $MX_a$, where M is selected from the group consisting of Li, Na, K, Rb, Cs, Fr; Be, Mg, Ca, Sr, Ba, Ra; Al, and a combination thereof, subscript a is an integer of 1 or more, and each X is independently a halogen atom, thereby preparing a molten salt;
(ii) introducing to the molten salt, a gas comprising a silane of formula $H_b SiX_{(4-b)}$, where subscript b is an integer from 0 to 4; and passing an electric current through the molten salt, thereby producing an electrolysis product. In this process, introducing the gas and passing the charge through the molten salt may be performed concurrently (simultaneously). Alternatively, introducing the gas and passing the current through the molten salt may be performed sequentially in any order; or alternatively, a combination thereof. For example, step (ii) may be performed by beginning to introduce the gas to the molten salt, and thereafter beginning to pass the current through the molten salt. Alternatively, step (ii) may be performed by beginning to pass a current through the molten salt, and thereafter beginning to introduce the gas to the molten salt. In this embodiment, current may continue to be passed through the molten salt while gas is introduced.

In step (i), ingredients comprising (a) a metal halide of formula $MX_a$ may be used as starting material. In this formula, M is selected from Li, Na, K, Rb, Cs, Fr; Be, Mg, Ca, Sr, Ba, Ra, Al, or a combination thereof. Alternatively, M may be selected from Al, K, Li, Mg, Na, or a combination thereof. Alternatively, M may be selected from Al, K, Mg, Na, or a combination thereof. Alternatively, M may be selected from Al, Ca, or Mg. Alternatively, M is Mg. Each X is independently selected from Br, Cl, F, and I. Alternatively, each X is independently selected from Br, Cl, and F. Alternatively, each X is independently selected from Br, Cl, and I. Alternatively, each X is Cl. Subscript a is an integer with a value of 1 or more. The maximum value of subscript a depends on which metal is selected for M, and is equal to the maximum common oxidation state of the metal selected for M.

In this process, one salt may be used. Alternatively, a mixture of two or more salts may be used. When a mixture of salts is present, the salt may comprise two or more metal halides. Alternatively, the salt may comprise one or more metal halides, and the salt in step (i) may further comprise (b) a metal selected from Li, Na, K, Rb, Cs, Fr, Be, Mg, Ca, Sr, Ba, Ra, Al, or a combination thereof. Alternatively, the metal for ingredient (b) may be selected from Al, Ca, or Mg. Alternatively, the metal for ingredient (b) may be Mg. The amount of metal present depends on various factors such as the metal halide and amount thereof selected, and the capability of the electrolytic cell, however, the amount of metal for ingredient (B) may be 0% to 99.9%, alternatively 1% to 90%, based on the combined weight of all ingredients in the salt.

This process may optionally further comprise adding, to the salt, ingredient (c) an ionic liquid. The ionic liquid can be an organic-based or an organosilicon-based ionic liquid. Without wishing to be bound by theory, it is thought that the ionic liquid may act as a solvent that may be added to improve conductivity and/or lower the melting temperature and/or increase the kinetic rate of the reaction and/or improve the selectivity of the reaction to the desired silicide product in step (ii). Ionic liquids usually offer a wide electrochemical window to support the voltage where the electrochemistry (electroreduction) needs to occur. The 'electrochemical window' of a substance refers to the voltage range between the upper and lower limits of which range the substance is neither oxidized nor reduced. Without wishing to be bound by theory, it is thought that it is desirable for the potential of the compound of interest for either reduction or oxidation to reside within the electrochemical window of the conductive media (i.e., the molten salt, described above, which may include an ionic liquid and/or a solvent). The electrochemical window of the molten salt represents the voltage range that will cause electrolyte in the molten salt to undergo reduction to prepare the desired silicide product. Some examples of organic-based ionic liquids are (a) 1-butyl-3-methylimidazolium hexafluorophosphate, (b) N,N-propylmethylpyrrolidinium tetrafluoroborate, (c) N,N propylmethylpyrrolidinium bis-(trifluoromethylsulfonyl)imide, and (d) 1-butylpyridinum nitrate. Examples of organosilicon-based ionic liquids are (a) 1-methyl-3siloxysilyl-alkylimidazolium bromide, and (b) 1-methyl-3-pentamethyldisiloxysilylmethylimidazolium chloride. The exact amount of ionic liquid depends on various factors including the metal halide selected and the ionic liquid selected, however, the amount of ionic liquid may range from 0% to 99.9% based on the combined weight of all ingredients in the salt.

Heating in step (i) is performed at a temperature and for a time sufficient to achieve ionic conductivity and reaction rate sufficient to cause the electrolysis product to form. Usually, heating causes at least a portion of the salt to be in a liquid state. Heating in step (i) may occur at the melting point of the salt or at a higher temperature than the melting point of the salt, or where a mixture of salts is used, at a temperature above the solidus line for the mixture. The exact time and temperature for heating depends on various factors including the type and amount of ingredients used in step (i), and the temperature where the salt begins to melt (e.g., the melting temperature, or the solidus temperature of a mixture of salts). However, the temperature may range from 400° C. to 850° C., alternatively 50° C. to 1000° C. Alternatively, when the salt used in step (i) comprises $MgCl_2$, temperature may range from 50° C. to 900° C., alternatively 80° C. to 900° C., alternatively 150° C. to 900° C., alternatively 250° C. to 900° C., alternatively 300° C. to 900° C., and 800° C. to 850° C. Without wishing to be bound by theory, it is thought that at sufficiently high currents, the heating can become self-sustaining due to the resistive nature of the salt, and this does not require external heating during all of step (i), i.e., heating during step (i) may include external heating during all, or only a portion, of step (i).

The process may optionally further comprise: drying the salt before step (i). Drying may be performed by any convenient means. Drying the salt may comprise heating, for example, at a temperature ranging from 120° C. to 300° C., alternatively 120° C. to 200° C., for 2 h to 9 h, alternatively 3 h to 4 h. Heating may be performed by any convenient means, such as placing a container of the salt in an oven. Alternatively, drying may comprise passing a gas through the salt. The gas may comprise a dry inert gas such as Ar or $N_2$, with or without heating the dry inert gas. Alternatively, the gas may be a gas that can displace water from the salt, such as $X_2$ and/or HX, where X is a halogen atom that may be the same as, or different from, a halogen atom in the metal halide, e.g., HX may be HCl.

The process further comprises step (ii), introducing a (reactant) gas into the molten salt and passing an electric current through the molten salt, thereby producing an electrolysis product. The gas comprises a silane of formula $H_bSiX_{(4-b)}$, where each X is independently a halogen atom that may be the same as, or different from, a halogen atom in the metal halide, and subscript b is an integer from 0 to 4. Alternatively, each X in the silane is Cl. Alternatively, subscript b is 0 to 3. Alternatively, subscript b is 0. The gas may optionally further comprise $H_2$ in addition to the silane. The $H_2$ may be introduced by any convenient means, such as admixing with the silane before introducing the silane to the molten salt or by introducing the $H_2$ gas to the molten salt separately from the silane. The amount of silane (and $H_2$, when present) depends on various factors including the reactivity of the metal salt selected, the temperature of the molten salt, and the capability of the cell (e.g., geometry of the cell to achieve good current efficiency of the cell and durability of the cell, volume, voltage, voltage drop, solubility of the gas in the molten salt, and/or pressure). However, when $H_2$ is present, the relative amounts of silane:$H_2$ may range from 10:1 to 1:10. The gas may be introduced into the molten salt by any convenient means, such as bubbling the gas through the molten salt, sparging the molten salt with the gas, dissolving the silane in the molten salt, and/or pressurization to assist dissolution of the silane in the molten salt.

An electrolytic cell, such as a Downs cell or a Hall-Heroult cell, may be used to pass the electric current through the molten salt. The current depends on various factors including the capability of the electrolytic cell used and the desired production rate of product. The voltage will be determined by the reduction potential of the molten salt selected, as well as the desired overpotential to achieve sufficiently fast kinetic rate for the desired process to be efficient. Potential is the thermodynamically determined value (minimum voltage) needed for the reaction to begin, the process will run with some degree of overpotential to increase reaction rate. Overpotential represents a tradeoff between several factors: cell efficiency, the need to heat the cell, the desired kinetic rate of reaction, mass transfer effects like bubbling at the anode, and side reactions. It is possible to run the process at constant potential or current. Alternatively, if impurities tend to concentrate at one electrode, it is possible to run the process with direct electric current with an alternating current component to sweep out impurities (i.e., an AC current with a DC bias). The AC component can take a number of forms including a periodic reversal of potential, a sine wave, square wave, a sawtooth wave, or a periodic impulse potential. Several parameters will affect the reaction rate. In general, the higher the current the less time needed for reaction, lower current will require more time. Lower overvoltage may result in lower current and more time. In large scale processes (as compared to smaller, laboratory scale processes), there may be higher resistive losses between the electrodes, and currents can be as high as 100s of kiloamps at 6-7 V. In the laboratory scale, however, at the same voltage, currents may be 1-5 amps. Exact parameters may be selected depending on factors including electrode geometry, electrode separation distance and temperature.

The electrodes used in the electrolytic cell may have any convenient configuration and material of construction, such as carbon. Alternatively, the material of construction may be catalytic to a desired reaction, and/or the material of construction may be selected to affect the selectivity of a desired reaction. For example, alternatively, the electrodes may be formed from a metal such as Pt.

The process described herein may be performed in an inert atmosphere. Inert atmospheres include, but are not limited to $N_2$ gas, Ar gas, and a mixture of $N_2$ and Ar gases. The process described herein may be performed at atmospheric pressure (e.g., 101 kPa). Alternatively, one or more of the process steps may be performed at superatmospheric pressure. Alternatively, the process may be performed at >0 to 10 MPa, alternatively 100 kPa to 10 MPa, and alternatively 100 kPa to critical pressure of the silane selected in step (ii).

The process described above may optionally further comprise step (iii), recovering a product comprising a metal silicide (such as $Mg_2Si$) from the electrolysis product. Step (iii) may be performed by any convenient means, such as solvent extraction, slurry separation, or phase separation. Solvent extraction comprises dissolving or dispersing the electrolysis product in an organic solvent, thereby dissolving unreacted salt, and the reaction product could then be recovered by slurry separation techniques. Slurry separation techniques include using a settling drum, centrifugation, and/or filtering. Alternatively, phase separation may be performed, for example, by using a tap to pull off molten silicide from the expected position where the layer of molten silicide would form in the cell.

The electrolysis product prepared by the process comprises: (A) a product comprising a metal silicide, and (B) a by-product comprising $X_2$. The process may optionally further comprise step (iv), recovering the by-product and optionally recycling (using) the $X_2$ in a process for producing HX and/or for carbohalogenation reactions to generate $SiX_4$.

The by-product may further comprise HX, for example when the silane used in step (ii) has one or more hydrogen atoms, or if $H_2$ is introduced to the cell in step (ii). The HX may also be recovered by any convenient means, such as distillation, condensation, and/or scrubbing. The recovered by-products may optionally be further purified (e.g., by distillation and/or in-line filtration) before being recycled to (used in) another process.

The process may optionally further comprise step (v), reacting the halide of formula HX with the electrolysis product (or the metal silicide recovered therefrom), thereby preparing a reaction product comprising: (1) a desired product comprising one or more of $SiH_4$, $HSiX_3$, $H_2SiX_2$, and/or $H_3SiX$, and (2) a second product comprising $MX_a$, where M, X, and a are as described above. The process described herein may optionally further comprise step (vi) recovering $MX_a$, and recycling it in step (i) of this process. The desired product may be gaseous and may be removed from the cell and later condensed in a condenser. $MX_a$ may be left behind as a solid. Alternatively, the $MX_a$ may be filtered from the desired product.

Alternatively, the process may optionally further comprise reacting the electrolysis product (or the metal silicide recovered therefrom), with an aqueous acid, thereby preparing a reaction product comprising: (1) a desired product comprising one or more hydridosilanes of formulae $SiH_4$, $HSiX_3$, $H_2SiX_2$, or $H_3SiX$; and/or polysilanes of formulae $H_cSi_dX_e$, where subscript c is an integer of 1 or more, subscript d is an integer of 2 or more, and subscript e is an integer of 0 or more and (2) a second by-product comprising aqueous $MX_a$. The aqueous $MX_a$ may be partially or fully dehydrated by heating. The $MX_a$ if partially dehydrated may be further dehydrated by heating under dry HX or $X_2$ gas, and the dried $MX_a$ may then be recycled in step (i) of this process.

The process described herein may be used to prepare reactive metal silicides with metals of Group 1 of the periodic table, metals of Group 2 of the periodic table, and/or Al. Alternatively, the process may be used to prepare reactive metal silicides with metals of Group 1 of the periodic table. Alternatively, process may be used to prepare reactive metal silicides with metals of Group 2 of the periodic table. Alternatively, the process may be used to prepare $Mg_2Si$. In this process, each instance of M may be Mg. In this process, each instance of X may be Cl.

EXAMPLES

These examples are intended to illustrate some embodiments of the invention and should not be interpreted as limiting the scope of the invention set forth in the claims.

In example 1, 20 g Mg and 80 g $MgCl_2$ were loaded into a quartz crucible, and placed into a stainless steel high temperature molten salt electrolysis cell. A glassy carbon anode and cathode were used as the electrodes and provided electrical contact in the salt once melted. Ar was used to purge the cell of air prior to drying and electrolysis. The cell was heated at 120° C. for 2.5 hours to begin drying the $MgCl_2$ while purging with Ar. The temperature was then increased to 170° C. and 10 sccm of HCl was passed through the (powdered) $MgCl_2$ by sparging through a glass tube. Every 30 min, the temperature was increased by 20° C. until a final temperature of 300° C. was reached. At this point, the resulting salt mixture was heated to 800° C. Once the salt melted sufficiently such that conductivity was sufficient for electrolysis to begin, Ar at 15 sccm was first bubbled through a room temperature $SiCl_4$ bubbler before flowing into the electrolysis cell in order to introduce $SiCl_4$ vapor into the cell at a controlled flow rate. Over a period of 12.3 hours, 71,000 C (19.7 A-hrs) of electric charge was passed through the cell via a potentiostat. The resulting product was removed from the salt by dissolving the salt in an organic solvent in an Ar atmosphere. The presence of $Mg_2Si$ was verified via XRD. Standard powder diffraction patterns were collected in Bragg-Brentano geometry from 10° to 80° 2θ in 0.02° increments at 2.7°/minute with a Cu anode operating at 40 kV and 44 mA. A 10 mm height limiting slit, ½° divergence slit, open scattering slit, and open receiving slit are used, and intensity data are collected with a high speed detector. Key peaks used to determine the identity of the silicide were 2 theta values of 24.099, 27.89, 39.864, 47.125, 49.356, 57.647 63.386, 65.234, 72.38 degrees.

In example 2, 60 g of $MgCl_2$ was placed into an alumina crucible and placed into a high temperature stainless steel molten salt electrolysis cell. A glassy carbon anode and cathode were used as the electrodes and provided electrical contact in the salt once melted. Ar was used to purge the cell of air prior to drying and electrolysis. The cell was heated at 120° C. for 2 hours to dry the $MgCl_2$ while purging with Ar. The temperature was then increased to 170° C. and 10 sccm of HCl was passed through the $MgCl_2$. Every 20 min, the temperature was increased by 20° C. until a final temperature of 300° C. was reached. At this point, the salt mixture was heated to 850° C. Once the salt melted, electrolysis began. Ar at 40 sccm was bubbled through a room temperature $SiCl_4$ bubbler to introduce $SiCl_4$ vapor into the cell. Over a period of 21.5 hours, 106,300 C (29.5 A-hrs) of charge was passed through the cell via a potentiostat. The resulting product was removed from the salt by dissolving the salt in an organic solvent in an Ar atmosphere. The presence of $Mg_2Si$ was verified via XRD.

In example 3, 10 g Mg and 60 g $MgCl_2$ were loaded into an alumina crucible, and placed into a high temperature stainless steel molten salt electrolysis cell. A glassy carbon anode and cathode were used as the electrodes and provided electrical contact in the salt once melted. Ar was used to purge the cell of air before drying and electrolysis. The cell was heated at 120° C. for 2.5 hours to dry the MgCl$_2$ while purging with Ar. The temperature was then increased to 170° C. and 15 sccm of HCl was passed through the MgCl$_2$. Every 30 min, the temperature was increased by 20° C. until a final temperature of 300° C. was reached. At this point, the salt mixture was heated to 800° C. Once the salt melted, electrolysis began. Ar at 30 sccm was bubbled through a room temperature SiCl$_4$ bubbler to introduce SiCl$_4$ vapor into the cell. Over a period of 25.4 hours, 44527 C (12.4 A-hrs) of charge was passed through the cell via a potentiostat. The product was removed from the salt by dissolving the salt in an organic solvent in a glove box with an Ar atmosphere. The presence of Mg$_2$Si was verified via XRD.

Examples 1-3 show that an electrolytic process may be used to generate magnesium silicide and indicate the electrolytic process may be used to generate other Group 2 metal silicides. The process can use inexpensive by-products such as SiCl$_4$ and MgCl$_2$ as reactants. The combined electrolysis is represented by reaction (I) below.

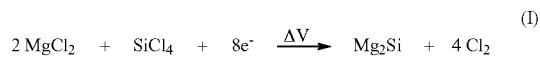

(I)

wherein e– are electrons. The by-product chlorine (Cl$_2$) can be recycled to be used in producing HCl or in carbochlorination reactions to generate SiCl$_4$, which may then be used as a reactant. The Mg$_2$Si can then be reacted with HCl to generate silane (SiH$_4$) according to reaction scheme (II) below.

(II)

The MgCl$_2$ can be recycled back as a reactant to the electrolysis reaction (I). The silane (SiH$_4$) can be used to make polycrystalline silicon, which is useful in the solar industry and/or the semiconductor industry and/or the electronics industry. This process may provide the benefits of generating reactive silicides, using them to prepare reactants useful in the solar, semiconductor, and electronics industries, and managing by-products produced in the silicon and silicone industries.

In example 4, a mixture of 8.36 g NaCl, 4.50 g KCl, and 28.5 g AlCl$_3$ (from Sigma Aldrich of St. Louis, Mo., U.S.A.) was placed in a glass electrolysis cell. The salt mixture had a melting point of 125° C. The cell was designed such that when a graphite cathode and graphite anode were placed into the salts, the cathode and anode would make electrical contact with the molten salt mixture once melted. The anode was surrounded by a glass tube, which had a slow flow of Ar gas passing there through to remove chlorine formed during electrolysis and improve current efficiency by reducing the amount of Cl$_2$ recombination at the cathode. The entire cell was purged with 50 sccm Ar gas for 30 min and then heated to 400° C. while continuing to purge with Ar gas. The gas was introduced into the electrochemical cell through a glass tube such that any gas introduced into the cell would bubble through the molten salt near the cathode. The Ar purge was then turned off after 30 min, and a mixture of 30 sccm H$_2$ and 7.5 sccm SiCl$_4$ was introduced to the cell via bubbling through the molten salt near the cathode. The SiCl$_4$ vapor was introduced into the hydrogen stream by first bubbling H$_2$ through a liquid bubbler containing SiCl$_4$ and allowing the gas stream to equilibrate with the liquid before entering the electrochemical cell. Electrolysis was carried out by maintaining a bias of 5.0 V between the cathode and anode using a lab power supply for 20 min. The cell current was 0.3 A. After electrolysis, the potential was removed from the electrodes and the cell was purged with 50 sccm Ar while cooling. After cooling, the salt was removed and several small pieces of the cathode and attached nodules of potentially reduced materials were removed for analysis. XRD indicated the formation of a crystalline K$_6$Si$_2$O$_7$ phase in that XRD reflected 20 peak positions corresponded to the phase K$_6$Si$_2$O$_7$. Since oxygen was introduced to pieces after reaction was completed and cooled, the crystalline K$_6$Si$_2$O$_7$ phase indicates that KSi was formed in the cell and was subsequently oxidized on exposure to air during mounting and analysis by XRD. Standard powder diffraction patterns were collected in Bragg-Brentano geometry from 10° to 80° 2θ in 0.02° increments at 5°/minute with a Cu anode operating at 40 kV and 44 mA. A 10 mm height limiting slit, ½° divergence slit, open scattering slit, and open receiving slit are used, and intensity data are collected with a high speed detector. Key peaks used to determine the identity of the K$_6$Si$_2$O$_7$ were 2 theta values of 16.961, 28.342, 29.415, 30.889, 31.807, 31.828, 32.853, 33.487, 34.678, 34.684, 35.016, 35.601, 38.872, 39.621, and 42.784 degrees.

The invention claimed is:

1. A process comprising:
    (i) heating a salt comprising (a) a halide of a metal of formula MX$_a$, where M is selected from the group consisting of Li, Na, K, Rb, Cs, Fr, Be, Mg, Ca, Sr, Ba, Ra, Al, and a combination thereof, subscript a is an integer of 1 or more, and each X is a halogen atom, thereby preparing a molten salt;
    (ii) introducing to the molten salt, a gas comprising a silane of formula H$_b$SiX$_{(4-b)}$, where subscript b is an integer from 0 to 4, and passing an electric current through the molten salt, thereby producing an electrolysis product comprising a silicide of the metal.

2. The process of claim 1, where one of conditions (a) and (b) is met, and
    condition (a) is M is Al, K, Li, Mg, Na, or a combination thereof; or
    condition (b) is M is Al, Ca, Mg, or a combination thereof.

3. The process of claim 1, where the salt further comprises at least one of ingredients (b) and (c), where
    ingredient (b) is a metal selected from Li, Na, K, Rb, Cs, Fr; Be, Mg, Ca, Sr, Ba, Ra, Al, or a combination thereof, and
    ingredient (c) is an ionic liquid.

4. The process of claim 3, where one of conditions (i) and (ii) is satisfied, and
    condition (i) is (b), the metal, is Al, K, Li, Mg, Na, or a combination thereof; or
    condition (ii) is (b), the metal, is Al, Ca, Mg, or a combination thereof.

5. The process of claim 1, where b is 0 to 3.

6. The process of claim 1, further comprising: drying the salt before step (i).

7. The process of claim 1, where the gas in step (ii) further comprises H$_2$.

8. The process of claim 1, further comprising (iii) recovering a product comprising a metal silicide from the electrolysis product.

9. The process of claim 1, where the process steps are performed under an inert gas atmosphere.

10. The process of claim 1, where the electrolysis product comprises
    (A) the metal silicide, and
    (B) a second product comprising X$_2$.

11. The process of claim 10, further comprising: (iv) recovering the second product from the electrolysis product and optionally recycling the $X_2$ to a process for producing HX and/or to carbohalogenation reactions to generate $SiX_4$.

12. The process of claim 10, further comprising (v) reacting a halide of formula HX with the electrolysis product comprising the metal silicide, thereby preparing a reaction product comprising
   (1) a product comprising one or more hydridosilanes of formulae $SiH_4$, $HSiX_3$, $H_2SiX_2$, and/or $H_3SiX$; and
   (2) a third product comprising $MX_a$.

13. The process of claim 10, further comprising (v) reacting the electrolysis product, with an aqueous acid, thereby preparing a reaction product comprising:
   (1) a fourth product comprising one or more hydridosilanes of formulae $SiH_4$, $HSiX_3$, $H_2SiX_2$, or $H_3SiX$; and/or polysilanes of formulae $H_cSi_dX_e$, where subscript c is an integer of 1 or more, subscript d is an integer of 2 or more, and subscript e is an integer of 0 or more, and
   (2) a fifth product comprising aqueous $MX_a$.

14. The process of claim 13, further comprising: dehydrating the aqueous $MX_a$.

15. The process of claim 12, further comprising (vi) recycling the $MX_a$ in step (i).

16. The process of claim 1, where each X is Cl.

17. The process of claim 1, where each M is Mg.

18. The process of claim 11, further comprising (v) reacting a halide of formula HX with the electrolysis product comprising the metal silicide, thereby preparing a reaction product comprising
   (1) a product comprising one or more hydridosilanes of formulae $SiH_4$, $HSiX_3$, $H_2SiX_2$, and/or $H_3SiX$; and
   (2) a third product comprising $MX_a$.

19. The process of claim 11, further comprising (v) reacting the electrolysis product (or the metal silicide recovered from the electrolysis product), with an aqueous acid, thereby preparing a reaction product comprising:
   (1) a fourth product comprising one or more hydridosilanes of formulae $SiH_4$, $HSiX_3$, $H_2SiX_2$, or $H_3SiX$; and/or polysilanes of formulae $H_cSi_dX_e$, where subscript c is an integer of 1 or more, subscript d is an integer of 2 or more, and subscript e is an integer of 0 or more, and
   (2) a fifth product comprising aqueous $MX_a$.

20. The process of claim 14, further comprising (vi) recycling the $MX_a$ in step (i).

* * * * *